United States Patent
Kajiwara et al.

(10) Patent No.: US 8,383,281 B2
(45) Date of Patent: Feb. 26, 2013

(54) FUEL CELL SYSTEM

(75) Inventors: Shigeto Kajiwara, Okazaki (JP); Shinji Aso, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 12/739,807

(22) PCT Filed: Oct. 15, 2008

(86) PCT No.: PCT/JP2008/069081
§ 371 (c)(1),
(2), (4) Date: Apr. 26, 2010

(87) PCT Pub. No.: WO2009/054389
PCT Pub. Date: Apr. 30, 2009

(65) Prior Publication Data
US 2010/0255396 A1   Oct. 7, 2010

(30) Foreign Application Priority Data

Oct. 26, 2007   (JP) ................................. 2007-278346

(51) Int. Cl.
*H01M 2/16* (2006.01)
*H01M 4/13* (2010.01)
*H01M 4/64* (2006.01)
*H01M 4/74* (2006.01)

(52) U.S. Cl. ......... 429/450; 429/428; 429/433; 429/442
(58) Field of Classification Search ................. 429/427, 429/428, 429, 433, 442, 450
See application file for complete search history.

(56) References Cited

FOREIGN PATENT DOCUMENTS

| DE | 100 13 687 B4 | 6/2007 |
|---|---|---|
| JP | 2005-108832 A | 4/2005 |
| JP | 2005-317211 A | 11/2005 |
| JP | 2006-079864 A | 3/2006 |
| JP | 2007-095655 A | 4/2007 |
| WO | 2005/053070 A1 | 6/2005 |

*Primary Examiner* — Carlos Barcena
(74) *Attorney, Agent, or Firm* — Kenyon & Kenyon LLP (57) ABSTRACT

A fuel cell system has a flooding elimination mode as one of available operation modes of fuel cells and includes a drive controller. When the ambient temperature of the fuel cell system is not higher than a preset first temperature, the drive controller causes the fuel cells to be driven in the flooding elimination mode. When the ambient temperature of the fuel cell system is not lower than a preset second temperature that is higher than the first temperature, the drive controller prohibits the fuel cells from being driven in the flooding elimination mode. On the occasion of input of a checkup instruction of the fuel cells, the drive controller causes the fuel cells to be driven in the flooding elimination mode, independently of the ambient temperature. This arrangement effectively improves the user's convenience at the checkup time of the fuel cell system having the operation mode for eliminating the state of flooding.

5 Claims, 6 Drawing Sheets

| | | AMBIENT TEMPERATURE | | |
|---|---|---|---|---|
| | | $T_0 \leq T_1$ | $T_1 < T_0 < T_2$ | $T_2 \leq T_0$ |
| CHECKING TOOL OFF | FLOODING ELIMINATION SWITCH OFF | ○ | × | × |
| | FLOODING ELIMINATION SWITCH ON | ○ | ○ | × |
| CHECKING TOOL ON | FLOODING ELIMINATION SWITCH OFF | ○ | × | × |
| | FLOODING ELIMINATION SWITCH ON | ○ | ○ | ○ |

○ : REQUIREMENT FOR ACTIVATION OF FLOODING ELIMINATION MODE
× : REQUIREMENT FOR DEACTIVATION OF FLOODING ELIMINATION MODE

| | | AMBIENT TEMPERATURE | | |
|---|---|---|---|---|
| | | $T_0 \leqq T_1$ | $T_1 < T_0 < T_2$ | $T_2 \leqq T_0$ |
| CHECKING TOOL OFF | FLOODING ELIMINATION SWITCH OFF | ○ | × | × |
| CHECKING TOOL OFF | FLOODING ELIMINATION SWITCH ON | ○ | ○ | × |
| CHECKING TOOL ON | FLOODING ELIMINATION SWITCH OFF | × | × | × |
| CHECKING TOOL ON | FLOODING ELIMINATION SWITCH ON | ○ | ○ | ○ |

○ : REQUIREMENT FOR ACTIVATION OF FLOODING ELIMINATION MODE
× : REQUIREMENT FOR DEACTIVATION OF FLOODING ELIMINATION MODE

FUEL CELL SYSTEM

This is a 371 national phase application of PCT/JP2008/069081 filed 15 Oct. 2008, which claims priority of Japanese Patent Application No. 2007-278346 filed 26 Oct. 2007, the contents of which are incorporated herein by reference.

TECHNICAL FIELD

The present invention relates to a fuel cell technology.

BACKGROUND ART

During power generation, water is generated in fuel cells through electrochemical reaction of hydrogen with oxygen, hereafter the water thus generated may be referred to as 'generated water'. For example, in a vehicle equipped with fuel cells, the fuel cells may be expected to start in a subfreezing environment. In this case, the generated water remaining in the fuel cells may be frozen to interrupt the smooth supply of fuel. This may lead to failure of power generation.

In a fuel cell system including fuel cells, one proposed technique drives the fuel cells in a heat retention mode in response to the user's selection in order to prevent the generated water from being frozen and stops the operation of the fuel cells in the heat retention mode when the ambient temperature reaches a sufficiently high level (see, for example, Japanese Patent Laid-Open No. 2005-108832, No. 2005-317211, No. 2007-95655, and No. 2006-79864).

The generated water that is not frozen but is accumulated in the vicinity of electrolyte membranes, this phenomenon is generally called 'flooding', may still interrupt the smooth supply of fuel and lower the performance of the fuel cells. In such cases, water content control may be performed to regulate the water content in the electrolyte membranes included in the fuel cells during operation of the fuel cells. A scavenging process may also be performed to remove the generated water remaining in the fuel cells in a stop state of the fuel cells. The fuel cells may be driven in the heat retention mode described above. The operation of the fuel cells in the heat retention mode prevents the generated water from being liquefied and thereby eliminates the state of flooding. Any of such flooding elimination processes requires the additional power consumption and thereby worsens the fuel consumption rate. Under the condition of the high ambient temperature, there is a low probability of the occurrence of flooding. The flooding elimination process is thus often forced to stop at the high ambient temperature. The freeze of the generated water is the phenomenon resulting from the occurrence of flooding. The process of preventing the freeze is thus equivalent to the flooding elimination process.

Even under the condition of the high ambient temperature, the operation of the fuel cells in the heat retention mode or the scavenging process and the water content control may be required in certain circumstances. For example, in the event of a failure arising in the fuel cells, it is desirable to drive the fuel cell system in the heat retention mode with the view to identifying the cause of the failure. The operation of the fuel cells in the heat retention mode can exclude the flooding as a possible cause of the failure. When there is still a failure in the fuel cells driven in the heat retention mode, the cause of the failure can be identified as a reason other than the flooding, for example, the occurrence of some cracking.

SUMMARY

There would thus be a requirement for improving the user's convenience at the checkup time of a fuel cell system having an operation mode for eliminating the state of flooding.

One aspect of the invention provides a fuel cell system having a flooding elimination mode as one of available operation modes of fuel cells, the fuel cell system comprising:

a drive controller configured to, when ambient temperature of the fuel cell system is equal or lower than a preset first temperature, cause the fuel cells to be driven in the flooding elimination mode and to, when the ambient temperature of the fuel cell system is equal or higher than a preset second temperature that is higher than the first temperature, prohibit the fuel cells from being driven in the flooding elimination mode, on an occasion of input of a checkup instruction of the fuel cells, the drive controller causes the fuel cells to be driven in the flooding elimination mode, independently of the ambient temperature.

In the fuel cell system according to this aspect of the invention, on the occasion of input of the checkup instruction, the fuel cells are driven in the flooding elimination mode, independently of the ambient temperature. The fuel cell system of the invention eliminates the state of flooding and thereby desirably excludes the flooding as a possible cause of a failure at the checkup time of the fuel cells. This arrangement accordingly improves the user's convenience at the checkup time of the fuel cell system.

The fuel cell system may be further including an input device, under a condition that the ambient temperature of the fuel cell system is higher than the first temperature but is lower than the second temperature, when a drive instruction for driving the fuel cells in the flooding elimination mode is input via the input device, the drive controller causes the fuel cells to be driven in the flooding elimination mode.

In the fuel cell system of this application, when the ambient temperature of the fuel cell system is between the preset first temperature and the preset second temperature, the fuel cells can be driven in the flooding elimination mode in response to the user's demand, for example, in response to the user's operation of the input device to input the drive instruction for driving the fuel cells in the flooding elimination mode.

The fuel cell system, wherein on the occasion of input of the checkup instruction of the fuel cells, when the drive instruction for driving the fuel cells in the flooding elimination mode is input via the input device, the drive controller may cause the fuel cells to be driven in the flooding elimination mode, independently of the ambient temperature.

In the fuel cell system of this application, even on the occasion of input of the checkup instruction, the fuel cells are not allowed to be driven in the flooding elimination mode unless the drive instruction for driving the fuel cells in the flooding elimination mode is input via the input device. Namely on the occasion of input of the checkup instruction, the user can use the input device to arbitrarily drive the fuel cells in the flooding elimination mode, independently of the ambient temperature.

The fuel cell system, wherein in response to connection of a checkup device to the fuel cell system, the drive controller may identify the input of the checkup instruction.

In the fuel cell system of this application, the connection of the checkup device can terminate the operation control of driving the fuel cells in the flooding elimination mode according to the ambient temperature.

The fuel cell system, wherein the flooding elimination mode may represent an operation mode performing at least one of processing operations: a heat retention process of keeping an internal temperature of the fuel cells at a preset temperature level during operation of the fuel cells; a water content control process of regulating a water content in electrolyte membranes included in the fuel cells during operation of the fuel cells; and a scavenging process of removing water generated in the fuel cells in a stop state of the fuel cells.

The technique of the present invention may be actualized by diversity of applications including the fuel cell system, a vehicle equipped with the fuel cell system, and an operation method of fuel cells.

BRIEF DESCRIPTION OF THE DRAWINGS

FIG. 3 is a table showing the requirements for activation and deactivation of a flooding elimination mode determined by the combinations of three conditions, an ON condition and an OFF condition of a checking tool 200, an ON position and an OFF position of a flooding elimination switch 58, and an ambient temperature To;

FIG. 6 is a table showing the requirements for activation and deactivation of the flooding elimination mode determined by the combinations of the three conditions, the ON condition and the OFF condition of the checking tool 200, the ON position and the OFF position of the flooding elimination switch 58, and the ambient temperature To.

BEST MODES OF CARRYING OUT THE INVENTION

Figure 1:
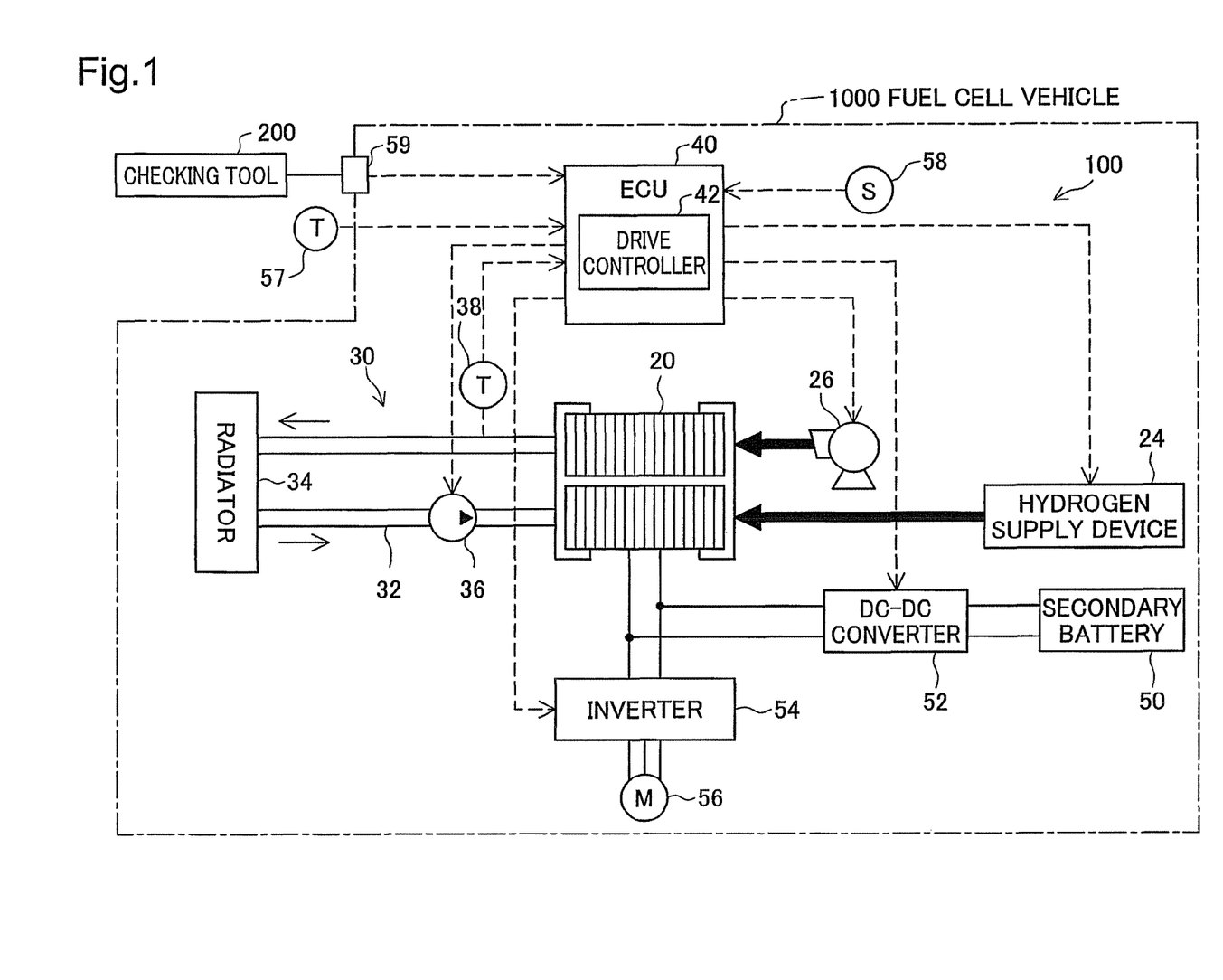
FIG. 1 is an explanatory view schematically illustrating the configuration of a fuel cell vehicle 1000 equipped with a fuel cell system 100 in a first embodiment of the invention.

Some modes of carrying out the invention are described below in the following sequence with reference to the accompanied drawings:
A. First Embodiment
B. Second Embodiment
C. Other Aspects
A1. Configuration of Fuel Cell Vehicle FIG. 1 is an explanatory view schematically illustrating the configuration of a fuel cell vehicle 1000 equipped with a fuel cell system 100 in a first embodiment of the invention. The fuel cell vehicle 1000 includes the fuel cell system 100, a secondary battery 50, a motor 56, an ECU 40, a DC/DC converter 52, and an inverter 54 as main components. The fuel cell vehicle 1000 is driven with driving power of the motor 56, which is activated by a fuel cell stack 20 as a main power source and the secondary battery 50 as an auxiliary power source.

The ECU 40 is constructed as a microcomputer-based logic circuit and controls the operations of the respective constituents in the fuel cell vehicle 1000. The ECU 40 receives signals from various sensors and switches provided on the fuel cell vehicle 1000, while outputting control signals to the DC/DC converter 52 and the inverter 54 to control the operations of the motor 56. The ECU 40 also controls the operations of the fuel cell system 100 as discussed later.

The secondary battery 50 is connected in parallel with the fuel cell stack 20 via the DC/DC converter 52. The inverter 54 generates three-phase alternating current power from the direct current powers and supplies the generated three-phase alternating current power to the motor 56 to control the rotation speed and the torque of the motor 56. The motor 56 has a rotating shaft linked with wheels (not shown) via a gear and a shaft (not shown) and is driven to give propulsive power to the fuel cell vehicle 1000.

A2. Structure of Fuel Cell System

The fuel cell system 100 includes the fuel cell stack 20, a hydrogen supply device 24, a blower 26, a cooling device 30, the ECU 40, a flooding elimination switch 58, input/output terminals 59, and an ambient temperature sensor 57 as main components. Various types of fuel cells may be adopted for the fuel cell stack 20. In this embodiment, the fuel cell stack 20 includes polymer electrolyte fuel cells.

The hydrogen supply device 24 is constructed to store hydrogen therein and supply gaseous hydrogen as a fuel gas to anodes in the fuel cell stack 20. The hydrogen supply device 24 may be, for example, a hydrogen gas cylinder or a hydrogen tank with a hydrogen storage alloy provided therein. Fuel gas emission discharged from the anodes after electrochemical reaction is introduced into a flow path connecting the hydrogen supply device 24 with the fuel cell stack 20 and is reused for the electrochemical reaction (not shown). The blower 26 takes the air in from the atmosphere and supplies the intake air as an oxidizing gas to cathodes in the fuel cell stack 20.

The cooling device 30 includes a cooling water flow path 32 arranged to go through inside of the fuel cell stack 20, a radiator 34, and a pump 36. The pump 36 is activated to circulate cooling water through the cooling water flow path 32. Heat is generated with the progress of the electrochemical reaction in the fuel cell stack 20. During power generation, cooling water is circulated in the fuel cell stack 20 and is cooled down by the radiator 34, so that the internal temperature of the fuel cell stack 20 is kept in a preset temperature range. The radiator 34 has a cooling fan (not shown), which is used to facilitate the cooling of the cooling water by the radiator 34.

A temperature sensor 38 is provided in the cooling water flow path 32 at a specific location close to the joint between the cooling water flow path 32 and the fuel cell stack 20 and on the side of discharging the cooling water from the fuel cell stack 20. A detection signal of the temperature sensor 38 is sent to the ECU 40 at preset time intervals. The ECU 40 outputs a control signal to the pump 36 in response to reception of the detection signal and thereby regulates the internal temperature of the fuel cell stack 20. In the drawing of FIG. 1, solid arrows represent directions of circulation of the cooling water in the cooling water flow path 32.

When the fuel cell stack 20 is driven in a flooding elimination mode as discussed below, the cooling device 30 uses an electric heater (not shown) to heat up the cooling water and makes the hot water circulated in the fuel cell stack 20, thereby increasing the internal temperature of the fuel cell stack 20. The cooling device 30 stops the operation of the cooling fan and prevents a temperature decrease of the cooling water, thereby keeping the internal temperature of the fuel cell stack 20 in a high temperature range.

The ambient temperature sensor 57 is located on the outer circumference of the fuel cell vehicle 1000 to measure the ambient temperature and sends the measured ambient temperature in the form of a detection signal to the ECU 40. The flooding elimination switch 58 is located on an instrument panel (not shown) provided in a front portion of the interior of the fuel cell vehicle 1000 and is operable by the driver. The input/output terminals 59 are located in the instrument panel. A checking tool 200 is connectable to the input/output terminals 59. Signals are transmittable between the ECU 40 and the checking tool 200 via the input/output terminals 59. The checking tool 200 may be, for example, a fault diagnosis device used for checking and servicing in automobile dealers.

The ECU 40 has the function of a drive controller 42 to control the operations of the fuel cell stack 20. When the driver operates a startup switch (not shown) located on the instrument panel (not shown) provided in the front portion of the vehicle interior to turn an IG (ignition) switch ON and subsequently turns a ST (start) switch ON, the drive controller 42 starts the operations of the fuel cell system 100 in response to a signal from the startup switch. Here the terminology 'IG' is short for 'ignition', which originally means ignition of an internal combustion engine. The term 'ignition switch' may thus not be quite suitable for the fuel cell system 100, but has been used for many years in the art as a word meaning a start switch of a vehicle. In view of such background, the term 'IG switch' represents an operator used as a start switch of the vehicle in the specification hereof. In the fuel cell system 100 of the embodiment, in response to an ON operation of the IG switch, the electric power is supplied to the ECU 40, the hydrogen supply device 24, the blower 26, and the cooling device 30. In response to an ON operation of the ST switch, the ECU 40 controls the operations of the hydrogen supply device 24, the blower 26, and the cooling device 30 to start the operations of the fuel cell system 100.

The drive controller 42 receives signals from the ambient temperature sensor 57, the flooding elimination switch 58, and the checking tool 200 and, upon satisfaction of predetermined conditions, causes the fuel cell stack 20 to be driven in the flooding elimination mode as one of available operation modes of the fuel cell stack 20.

Figure 4:
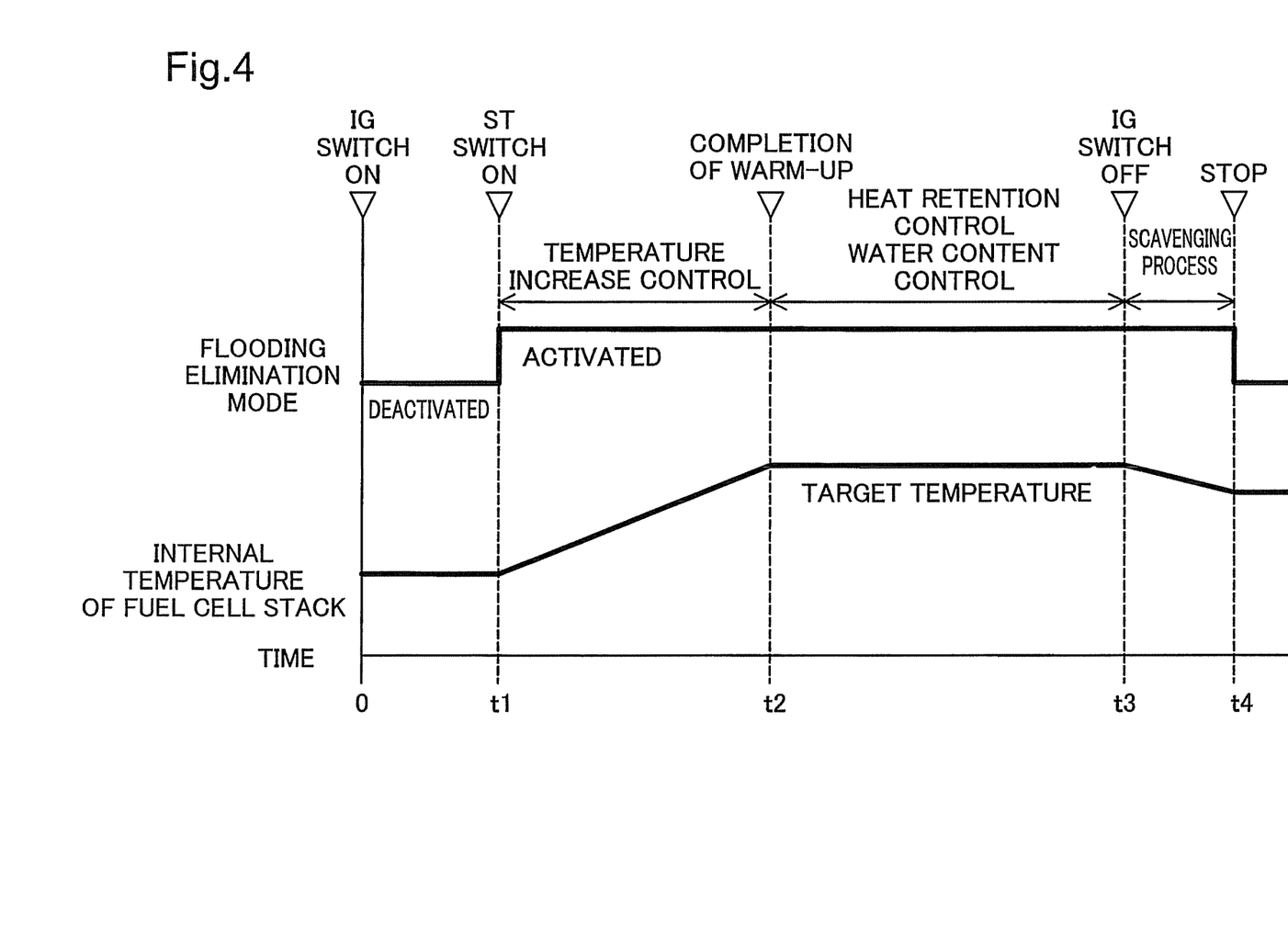
FIG. 4 is an explanatory view showing timings of respective processing operations in the flooding elimination mode.

The flooding elimination mode represents an operation mode performing various controls to eliminate the state of flooding in the fuel cell stack 20. Specifically the flooding elimination mode includes temperature increase control, water content control, heat retention control, and scavenging process. FIG. 4 is an explanatory view showing timings of respective processing operations in the flooding elimination mode. The details of the flooding elimination mode are explained below with reference to FIG. 4.

The temperature increase control abruptly increases the internal temperature of the fuel cell stack 20. One concrete procedure may use an electric heater to heat up the cooling water, thereby abruptly increasing the internal temperature of the fuel cell stack 20. As shown in FIG. 4, the temperature increase control is performed after the ON operation of the ST switch and continues until the internal temperature of the fuel cell stack 20 reaches a preset target temperature. The internal temperature of the fuel cell stack 20 is measured by the temperature sensor 38.

The heat retention control keeps the internal temperature of the fuel cell stack 20 at the preset target temperature. One concrete procedure may stop a fan (not shown) provided in the radiator 34 of the cooling device 30 to prevent a temperature decrease of the cooling water, thereby keeping the internal temperature of the fuel cell stack 20 at the preset target temperature. As shown in FIG. 4, the heat retention control is performed after completion of warm-up, or after the reach of the internal temperature of the fuel cell stack 20 to the preset target temperature, and continues until the OFF operation of the IG switch.

The water content control dries or moistens electrolyte membranes in the fuel cell stack 20, so as to keep the water content of the electrolyte membranes at a preset level. A concrete procedure may measure the membrane resistance (impedance) and humidify or dry the electrolyte membranes according to the impedance, thereby controlling the water content of the electrolyte membranes. As shown in FIG. 4, the water content control is performed concurrently with the heat retention control.

The scavenging process adjusts the water content of the electrolyte membranes in a preset adequate range in a stop state of the fuel cell system 100. A concrete procedure may control the blower 26 to supply the air to the fuel cell stack 20, thereby drying the electrolyte membranes. This scavenging process aims to prevent the water remaining in the fuel cell stack 20 from being frozen on a restart of the fuel cell system 100 in a subfreezing environment. As shown in FIG. 4, the scavenging process is performed after the OFF operation of the IG switch and is terminated when the water content of the electrolyte membranes enters the preset adequate range. Simultaneously with termination of the scavenging process, the fuel cell system 100 stops the operations.

In the timing chart of FIG. 4, the flooding elimination mode is activated concurrently with the ON operation of the ST switch. The requirement for activation or deactivation of the flooding elimination mode may be determined after the ON operation of the IG switch but before the ON operation of the ST switch. One concrete procedure may set a flooding elimination mode flag ON upon determination of the requirement for activation of the flooding elimination mode after the ON operation of the IG switch. The procedure may then actually activate the flooding elimination mode in response to the ON operation of the ST switch. The determination of the requirement for activation or deactivation of the flooding elimination mode will be discussed later in detail.

A3. Operations in Embodiment

Figure 2:
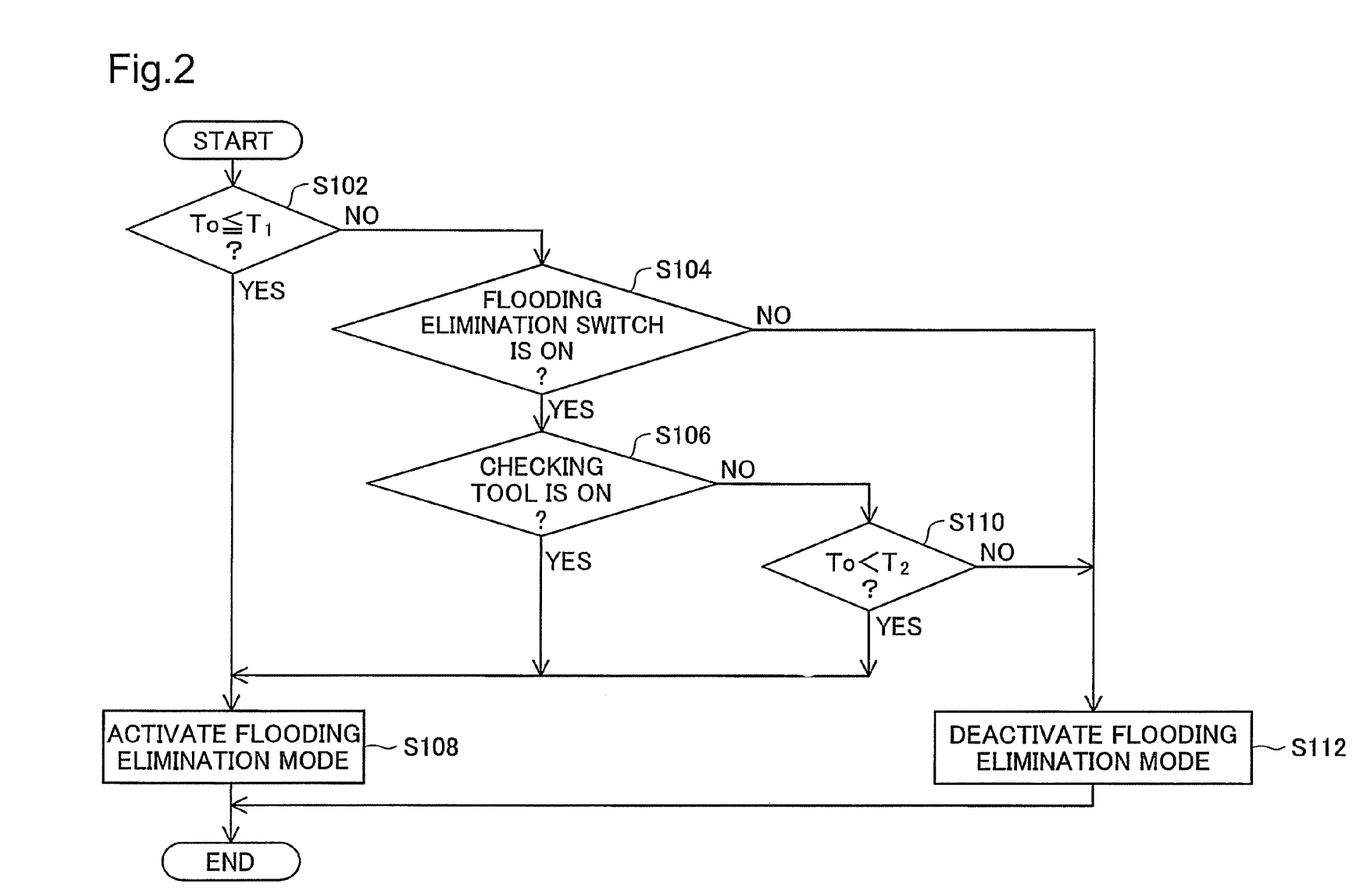
FIG. 2 is a flowchart showing a flooding elimination control routine performed in the first embodiment.

FIG. 2 is a flowchart showing a flooding elimination control routine executed by the ECU 40 in the fuel cell vehicle 1000. The flooding elimination control routine is performed repeatedly at preset intervals after the ON operation of the IG switch.

In this embodiment, at a checkup time of the fuel cell stack 20, the checker connects the checking tool 200 to the input/output terminals 59 via a connection cable, powers the checking tool 200 ON, and starts the fuel cell system 100. In response to reception of a power-on signal from the checking tool 200, the ECU 40 identifies input of a checkup instruction. The checking tool 200 and the power-on signal of the checking tool 200 in this embodiment respectively correspond to the input device and the checkup instruction in the claims of the invention.

The processing flow of the flooding elimination control routine in the state of no connection of the checking tool 200 or in the ordinary driving state of the fuel cell vehicle 1000 is discussed with reference to FIG. 2.

The drive controller 42 first determines whether the ambient temperature To is not higher than a first temperature T1 (step S102). The ECU 40 receives the detection signal from the ambient temperature sensor 57 at every preset time interval after the ON operation of the IG switch and makes the determination based on the received detection signal at step S102.

The first temperature T1 and a second temperature T2 (explained later) are set in advance. In this embodiment, the first temperature T1 is set to a specific temperature with high probability of freeze in the state of accumulation of generated water in the fuel cell stack 20, for example, a subfreezing temperature. The second temperature T2 is set to a high temperature with low probability of flooding.

Upon determination that the ambient temperature To measured by the ambient temperature sensor 57 is not higher than the first temperature T1 (step S102: Yes), the drive controller 42 activates the flooding elimination mode (step S108) and terminates this routine. Such control causes the fuel cell stack 20 to be driven in the flooding elimination mode.

The drive controller 42 performs this routine again after elapse of a predetermined time period. In the same manner as discussed above, the drive controller 42 first determines whether the measured ambient temperature To is not higher than the first temperature T1 (step S102). Upon determination that the ambient temperature To is higher than the first temperature T1 (step S102: No), the drive controller 42 identifies whether the flooding elimination switch 58 is set in the ON position or in the OFF position (step S104). In the ON position of the flooding elimination switch 58 (step S104: Yes), the drive controller 42 subsequently identifies whether the checking tool 200 is in the ON condition or in the OFF condition (step S106). In this state, since the checking tool 200 is not connected, the drive controller 42 identifies that the checking tool 200 is in the OFF condition (step S106: No) and then determines whether the ambient temperature To is lower than the second temperature T2 (step S110). Upon determination that the ambient temperature To is lower than the second temperature T2 (step S110: Yes), the processing flow goes to step S108, where the drive controller 42 activates the flooding elimination mode, and terminates this routine.

Upon determination at step S110 that the ambient temperature To is not lower than the second temperature T2, the processing flow goes to step S112, where the drive controller 42 deactivates the flooding elimination mode. In this case, the fuel cell stack 20 is not allowed to be driven in the flooding elimination mode but is driven in an ordinary drive mode. Namely when the ambient temperature To is not lower than the second temperature T2, even in the ON position of the flooding elimination switch 58, the fuel cell stack 20 is not allowed to be driven in the flooding elimination mode.

In the OFF position of the flooding elimination switch 58 at step S104, the drive controller 42 also deactivates the flooding elimination mode (step S112). In this case, the fuel cell stack 20 is not allowed to be driven in the flooding elimination mode but is driven in the ordinary drive mode.

Figure 3:
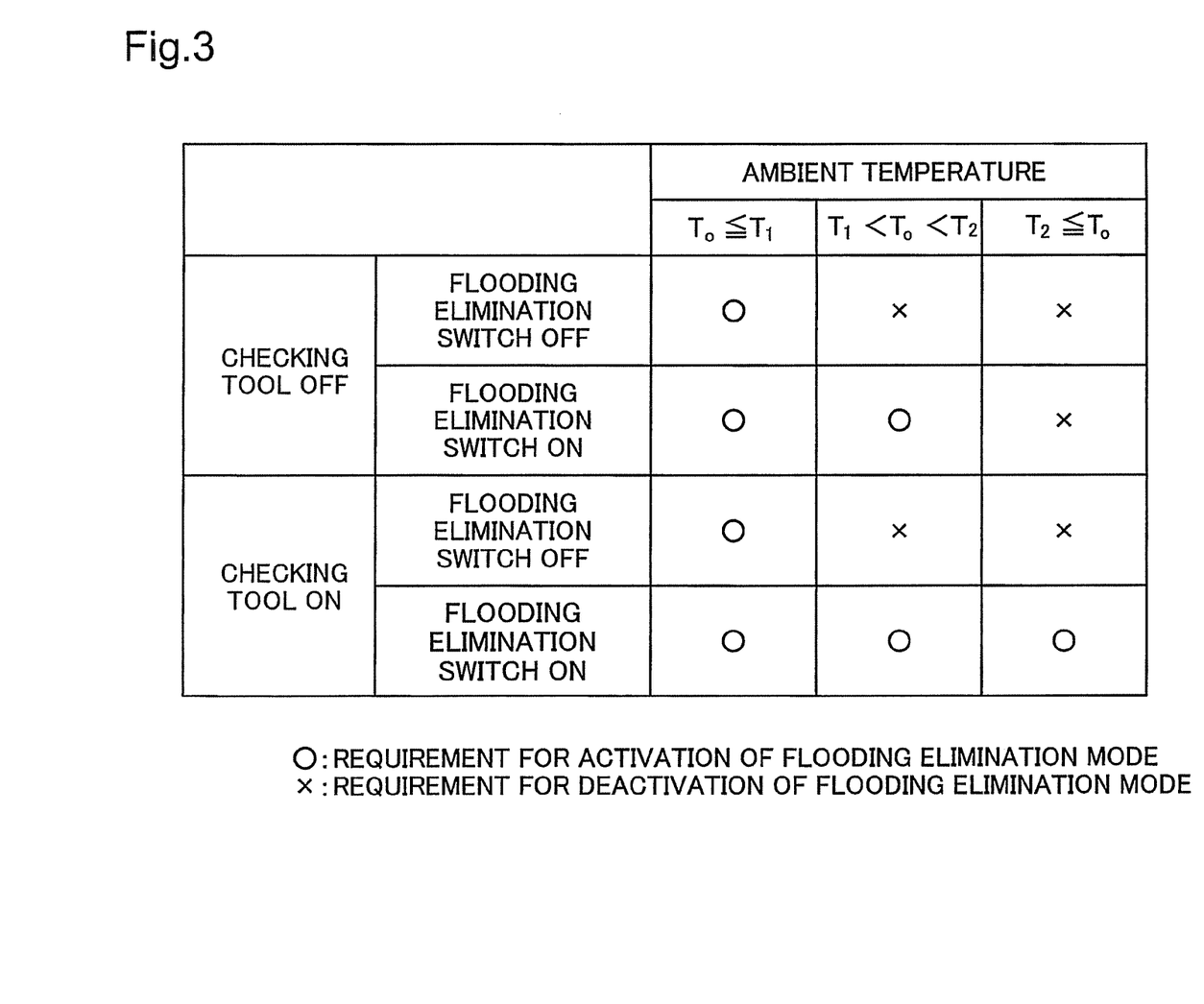

FIG. 3 is a table showing the requirements for activation and deactivation of the flooding elimination mode determined by the combinations of three conditions, the ON condition and the OFF condition of the checking tool 200, the ON position and the OFF position of the flooding elimination switch 58, and the ambient temperature To. In this table, the symbol 'O' represents the requirement for activation of the flooding elimination mode, and the symbol 'X' represents the requirement for deactivation of the flooding elimination mode.

In the state of no connection of the checking tool 200 discussed above, as shown in FIG. 3, when the ambient temperature To is not higher than the first temperature T1, the fuel cell stack 20 is driven in the flooding elimination mode (there is the requirement for activation of the flooding elimination mode), independently of the ON position or the OFF position of the flooding elimination switch 58. When the ambient temperature To is not lower than the second temperature T2, the fuel cell stack 20 is prohibited from being driven in the flooding elimination mode (there is the requirement for deactivation of the flooding elimination mode), independently of the ON position or the OFF position of the flooding elimination switch 58. When the ambient temperature To satisfies the relation of T1<To<T2 (T1: the first temperature, To: the ambient temperature, T2: the second temperature), the requirement for activation or deactivation of the flooding elimination mode is determined corresponding to the ON position or the OFF position of the flooding elimination switch 58.

As explained above, the flooding elimination switch 58 is provided on the instrument panel of the fuel cell vehicle 1000 and is operable by the driver. In the temperature condition of T1<To<T2 (T1: the first temperature, To: the ambient temperature, T2: the second temperature), the requirement for activation or deactivation of the flooding elimination mode is determined in response to the driver's demand. In this embodiment, when the ambient temperature To is not lower than the second temperature T2, the software-based control prohibits the fuel cell stack 20 from being driven in the flooding elimination mode, irrespective of the ON position of the flooding elimination switch 58. In one modification, when the ambient temperature To is not lower than the second temperature T2, the operation of the flooding elimination switch 58 may be prohibited in a mechanical manner.

The processing flow of the flooding elimination control routine at the checkup time of the fuel cell stack 20 is discussed with reference to FIG. 2. As mentioned previously, at the checkup time of the fuel cell stack 20, the checking tool 200 is connected to the input/output terminals 59 and is powered ON.

In the same manner as the above processing flow, the drive controller 42 first determines whether the ambient temperature To is not higher than the first temperature T1 (step S102). Upon determination that the ambient temperature To is not higher than the first temperature T1, the drive controller 42 activates the flooding elimination mode (step S108) and terminates this routine. Upon determination that the ambient temperature To is higher than the first temperature T1, on the other hand, the drive controller 42 identifies the ON position or the OFF position of the flooding elimination switch 58 (step S104). In the ON position of the flooding elimination switch 58 (step S104: Yes), the drive controller 42 subsequently identifies the ON condition or the OFF condition of the checking tool 200 (step S106). In this state, since the checking tool 200 is in the ON condition (step S106: Yes), the processing flow goes to step S108, where the drive controller 42 activates the flooding elimination mode. Such control causes the fuel cell stack 20 to be driven in the flooding elimination mode.

As shown in FIG. 3, in the ON condition of the checking tool 200, the flooding elimination mode is activated corresponding to the ON position of the flooding elimination switch 58, independently of the ambient temperature To. In the OFF position of the flooding elimination switch 58, on the other hand, the flooding elimination mode is activated only when the ambient temperature To is not higher than the first temperature T1.

A4. Effects of Embodiment

As described above, in the state of no connection of the checking tool 200 or in the ordinary driving state of the fuel cell system 100, the requirement for activation or deactivation of the flooding elimination mode is determined according to the ambient temperature. When the ambient temperature To is not higher than the first temperature T1, the fuel cell stack 20 is driven in the flooding elimination mode. When the ambient temperature To is higher than the first temperature T1 but is lower than the second temperature T2, the requirement for activation or deactivation of the flooding elimination mode is determined corresponding to the ON position or the OFF position of the flooding elimination switch 58 operated by the driver. When the ambient temperature To is not lower than the second temperature T2, the fuel cell stack 20 is prohibited from being driven in the flooding elimination mode.

In the ordinary driving state, under the condition of the low ambient temperature, the fuel cell stack 20 is driven in the flooding elimination mode. Such control eliminates the state of flooding and effectively prevents deterioration of the drive performance of the fuel cell stack 20. Under the condition of the high ambient temperature, on the other hand, the fuel cell stack 20 is prohibited from being driven in the flooding elimination mode. Such control effectively prevents the poor fuel consumption.

At the checkup time of the fuel cell stack 20, the fuel cell stack 20 is driven in the flooding elimination mode corresponding to the ON position of the flooding elimination switch 58, independently of the ambient temperature. Namely the checker's operation of the flooding elimination switch 58 causes the fuel cell stack 20 to be driven in the flooding elimination mode. For example, on the occasion of examining the cause of a failure arising in the fuel cell stack 20, the fuel cell stack 20 is driven in the flooding elimination mode even when the ambient temperature To is not lower than the second temperature T2. This procedure eliminates the state of flooding, which may trigger a failure, and thus facilitates finding out the real cause of the failure.

B. Second Embodiment

A fuel cell system of a second embodiment is mounted on the fuel cell vehicle 1000 in the same manner as the first embodiment. The fuel cell system of the second embodiment has the same configuration as that of the first embodiment, except a different flooding elimination control routine performed by the ECU 40. The like constituents to those of the first embodiment are thus expressed by the like numerals and symbols and are not specifically described here.

B1. Operations of Embodiment

Figure 5:
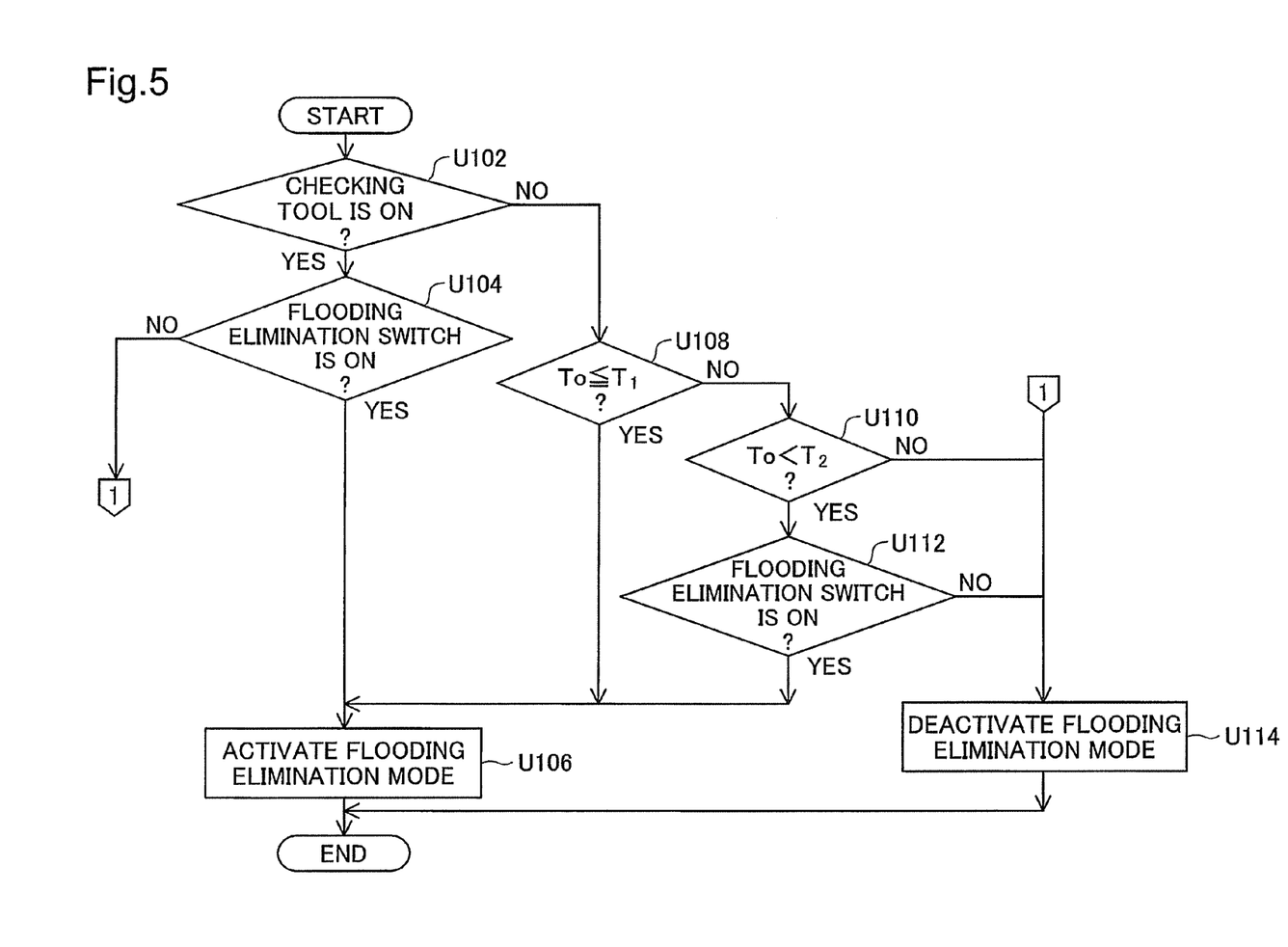
FIG. 5 is a flowchart showing a flooding elimination control routine performed in a second embodiment.

FIG. 5 is a flowchart showing a flooding elimination control routine performed in the second embodiment. In the second embodiment, as in the first embodiment, at the checkup time of the fuel cell stack 20, the checker connects the checking tool 200 to the input/output terminals 59 via a connection cable, powers the checking tool 200 ON, and starts the fuel cell system 100. In response to reception of a power-on signal from the checking tool 200, the ECU 40 identifies input of a checkup instruction. The processing flow of the flooding elimination control routine in the state of no connection of the checking tool 200 or in the ordinary driving state of the fuel cell vehicle 1000 is discussed with reference to FIG. 5.

The drive controller 42 first identifies whether the checking tool 200 is in the ON condition or in the OFF condition (step U102). In this state, since the checking tool 200 is not connected, the drive controller 42 identifies the OFF condition of the checking tool 200 (step U102: No). The drive controller 42 subsequently determines whether the ambient temperature To is not higher than the first temperature T1 (step U108). The first temperature T1 and the second temperature T2 used in the second embodiment are set in advance and are identical with those used in the first embodiment.

When the ambient temperature To measured by the ambient temperature sensor 57 is not higher than the first temperature T1 (step U108: Yes), the drive controller 42 activates the flooding elimination mode (step U106) and terminates this routine. Such control causes the fuel cell stack 20 to be driven in the flooding elimination mode.

The drive controller 42 performs this routine again after elapse of a predetermined time period. In the same manner as discussed above, the drive controller 42 successively performs the processing of step U102 and the processing of step U108. Upon determination that the ambient temperature To is higher than the first temperature T1 (step U108: No), the drive controller 42 subsequently determines whether the ambient temperature To is lower than the second temperature T2 (step U110). Upon determination that the ambient temperature To is lower than the second temperature T2 (step U110), the drive controller 42 identifies whether the flooding elimination switch 58 is set in the ON position or in the OFF position (step U112). In the ON position of the flooding elimination switch 58 (step U112: Yes), the processing flow goes to step U106, where the drive controller 42 activates the flooding elimination mode of the fuel cell stack 20, and terminates this routine.

In the OFF position of the flooding elimination switch 58 at step U112, the drive controller 42 deactivates the flooding elimination mode (step U114). In this case, the fuel cell stack 20 is not allowed to be driven in the flooding elimination mode but is driven in the ordinary drive mode. Namely even when the ambient temperature To satisfies the relation of T1<To<T2 (T1: the first temperature, To: the ambient temperature, T2: the second temperature), in the OFF position of the flooding elimination switch 58, the fuel cell stack 20 is not allowed to be driven in the flooding elimination mode.

Upon determination at step U110 that the ambient temperature To is not lower than the second temperature T2, the processing flow goes to step U114, where the drive controller 42 deactivates the flooding elimination mode. Namely when the ambient temperature To is not lower than the second temperature T2, the fuel cell stack 20 is not allowed to be driven in the flooding elimination mode, independently of the ON position or the OFF position of the flooding elimination switch 58.

Figure 6:
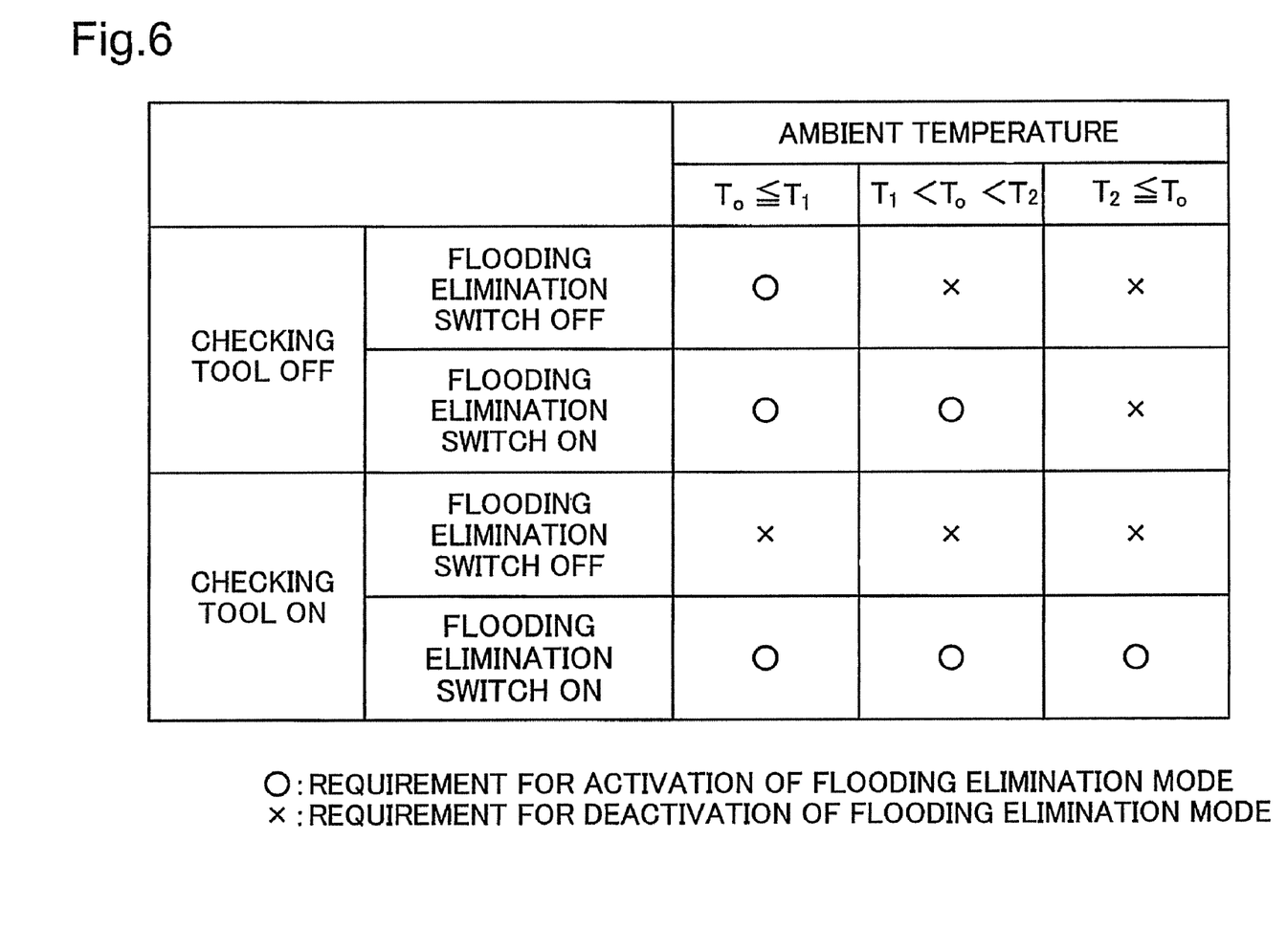

FIG. 6 is a table showing the requirements for activation and deactivation of the flooding elimination mode determined by the combinations of the three conditions, the ON condition and the OFF condition of the checking tool 200, the ON position and the OFF position of the flooding elimination switch 58, and the ambient temperature To. In the state of no connection of the checking tool 200 discussed above, as shown in FIG. 6, when the ambient temperature To is not higher than the first temperature T1, the fuel cell stack 20 is driven in the flooding elimination mode (there is the requirement for activation of the flooding elimination mode), independently of the ON position or the OFF position of the flooding elimination switch 58. When the ambient temperature To is not lower than the second temperature T2, the fuel cell stack 20 is prohibited from being driven in the flooding elimination mode (there is the requirement for deactivation of the flooding elimination mode), independently of the ON position or the OFF position of the flooding elimination switch 58. When the ambient temperature To satisfies the relation of T1<To<T2 (T1: the first temperature, To: the ambient temperature, T2: the second temperature), the requirement for activation or deactivation of the flooding elimination mode is determined corresponding to the ON position or the OFF position of the flooding elimination switch 58. In the OFF condition of the checking tool 200, the requirement for activation or deactivation of the flooding elimination mode is determined in the same manner as the first embodiment discussed previously.

The processing flow of the flooding elimination control routine at the checkup time of the fuel cell stack 20 is discussed with reference to FIG. 5. As mentioned previously, at the checkup time of the fuel cell stack 20, the checking tool 200 is connected to the input/output terminals 59 and is powered ON.

In the same manner as the above processing flow, the drive controller 42 first identifies whether the checking tool 200 is in the ON condition or in the OFF condition (step U102). In this state, since the checking tool 200 is in the ON condition (step U102: Yes), the drive controller 42 subsequently identifies whether the flooding elimination switch 58 is set in the ON position or in the OFF position (step U104). In the ON position of the flooding elimination switch 58 (step U104: Yes), the processing flow goes to step U106, where the drive controller 42 activates the flooding elimination mode. Such control causes the fuel cell stack 20 to be driven in the flooding elimination mode. In the OFF position of the flooding elimination switch 58 at step U104, the processing flow goes to step U114, where the drive controller 42 deactivates the flooding elimination mode. In this case, the fuel cell stack 20 is not allowed to be driven in the flooding elimination mode but is driven in the ordinary drive mode.

As shown in FIG. 6, in the ON condition of the checking tool 200, the requirement for activation or deactivation of the flooding elimination mode is determined corresponding to the ON position or the OFF position of the flooding elimination switch 58, independently of the ambient temperature To. In the first embodiment, at the checkup time, even in the OFF position of the flooding elimination switch 58, the flooding elimination mode is activated when the ambient temperature To is not higher than the first temperature T1. Namely when the ambient temperature To is not higher than the first temperature T1, there is the requirement for activation of the flooding elimination mode, independently of the ON condition or the OFF condition of the checking tool. In the second embodiment, on the other hand, at the checkup time, the requirement for activation or deactivation of the flooding elimination mode is determined corresponding to the ON position or the OFF position of the flooding elimination switch 58, independently of the ambient temperature. Namely even when the ambient temperature To is not higher than the first temperature T1, in the OFF position of the flooding elimination switch 58, the fuel cell stack 20 is not allowed to be driven in the flooding elimination mode.

B2. Effects of Embodiment

As described above, in the state of no connection of the checking tool 200 or in the ordinary driving state of the fuel cell system of the second embodiment, the requirement for activation or deactivation of the flooding elimination mode is determined according to the ambient temperature in the same manner as the first embodiment. At the checkup time of the fuel cell stack 20, on the other hand, the requirement for activation or deactivation of the flooding elimination mode is determined corresponding to the ON position or the OFF position of the flooding elimination switch 58, independently of the ambient temperature. The configuration of the second embodiment assures the similar effects to those of the first embodiment described above.

C. Other Aspects

The embodiments and their applications discussed above are to be considered in all aspects as illustrative and not restrictive. There may be many modifications, changes, and alterations without departing from the scope or spirit of the main characteristics of the present invention. Some examples of possible modification are given below.

(1) In the second embodiment discussed above, in the ON condition of the checking tool 200, the requirement for activation or deactivation of the flooding elimination mode is determined corresponding to the ON position or the OFF position of the flooding elimination switch 58, independently of the ambient temperature To. In one modification, in the state of connection of the checking tool 200, the flooding elimination mode may constantly be kept active. In this modified configuration, at the checkup time of the fuel cell stack 20, the fuel cell stack 20 is driven in the flooding elimination mode, independently of the ambient temperature. This modified procedure also eliminates the state of flooding, which may trigger a failure arising in the fuel cell stack 20, and thus facilitates finding out the real cause of the failure.

(2) In the embodiments discussed above, in the ON condition of the checking tool 200, the drive controller 42 identifies the input of the checkup instruction. The checkup instruction may be input into the drive controller 42 by any other suitable method. In one modified structure, a checkup switch may be provided in the instrument panel. In response to the checker's ON operation of the checkup switch, the checkup instruction may be input into the drive controller 42.

(3) In the embodiments discussed above, the drive controller 42 uses the detection signal of the ambient temperature sensor 57 to determine the level of the ambient temperature. The ambient temperature may be obtained by any of other diverse methods. One modified procedure may measure the temperature at a supply inlet of an air flow meter (not shown) used for regulating the amount of the air to be supplied to the fuel cell stack 20 and set the measured temperature to the ambient temperature.

(4) In the embodiments discussed above, the flooding elimination mode includes the temperature increase control, the heat retention control, the water content control, and the scavenging process. The flooding elimination mode is, however, not restricted to this series of processing operations. For example, the flooding elimination mode may include only one of these processing operations or may include different processing operations. Each of the processing operations is not restricted to the detail discussed in the embodiment but may have any detail as long as the state of flooding can be eliminated.

(5) In the embodiments discussed above, the checking tool 200 is used to checkup the fuel cell stack 20. The checking tool 200 may be constructed to check up not only the fuel cell stack 20 but diverse systems relating to the fuel cell vehicle 1000. In the case of various checkup operations with the checking tool 200 of the modified construction, the checker may operate the flooding elimination switch 58 to activate the flooding elimination mode according to the requirements.

(6) The above embodiments describe the application of the invention to the fuel cell system 100 mounted on the fuel cell vehicle 1000. The principle of the invention may be applied to a fuel cell system mounted on any of various moving bodies, such as aircraft, trains, boats and ships, as well as to a stationary fuel cell system.

The invention claimed is:

1. A fuel cell system having a flooding elimination mode as one of available operation modes of fuel cells, the fuel cell system comprising:
    a drive controller programmed to, when ambient temperature of the fuel cell system is equal or lower than a preset first temperature, cause the fuel cells to be driven in the flooding elimination mode and to, when the ambient temperature of the fuel cell system is equal or higher than a preset second temperature that is higher than the first temperature, prohibit the fuel cells from being driven in the flooding elimination mode,
    on an occasion of input of a checkup instruction of the fuel cells, the drive controller causes the fuel cells to be driven in the flooding elimination mode, independently of the ambient temperature;
    wherein the flooding elimination mode performs operating the fuel cells not to cause a flooding.

2. The fuel cell system in accordance with claim 1, the fuel cell system further including an input device, under a condition that the ambient temperature of the fuel cell system is higher than the first temperature but is lower than the second temperature, when a drive instruction for driving the fuel cells in the flooding elimination mode is input via the input device, the drive controller is programmed to cause the fuel cells to be driven in the flooding elimination mode.

3. The fuel cell system in accordance with claim 2, wherein on the occasion of input of the checkup instruction of the fuel cells, when the drive instruction for driving the fuel cells in the flooding elimination mode is input via the input device, the drive controller is programmed to cause the fuel cells to be driven in the flooding elimination mode, independently of the ambient temperature.

4. The fuel cell system in accordance with claim 1, wherein in response to connection of a checkup device to the fuel cell system, the drive controller is programmed to identify the input of the checkup instruction.

5. The fuel cell system in accordance with claim 1, wherein the flooding elimination mode represents an operation mode performing at least one of processing operations: a heat retention process of keeping an internal temperature of the fuel cells at a preset temperature level during operation of the fuel cells; a water content control process of regulating a water content in electrolyte membranes included in the fuel cells during operation of the fuel cells; and a scavenging process of removing water generated in the fuel cells in a stop state of the fuel cells.

* * * * *